July 2, 1929. C. O. ANDERSON Re. 17,344

AUTOMATIC BRAKE ADJUSTING MECHANISM

Original Filed March 26, 1927 3 Sheets-Sheet 1

INVENTOR
C. O. Anderson.
BY
Albert R. Dieterich
ATTORNEY

July 2, 1929. C. O. ANDERSON Re. 17,344
AUTOMATIC BRAKE ADJUSTING MECHANISM
Original Filed March 26, 1927 3 Sheets-Sheet 2
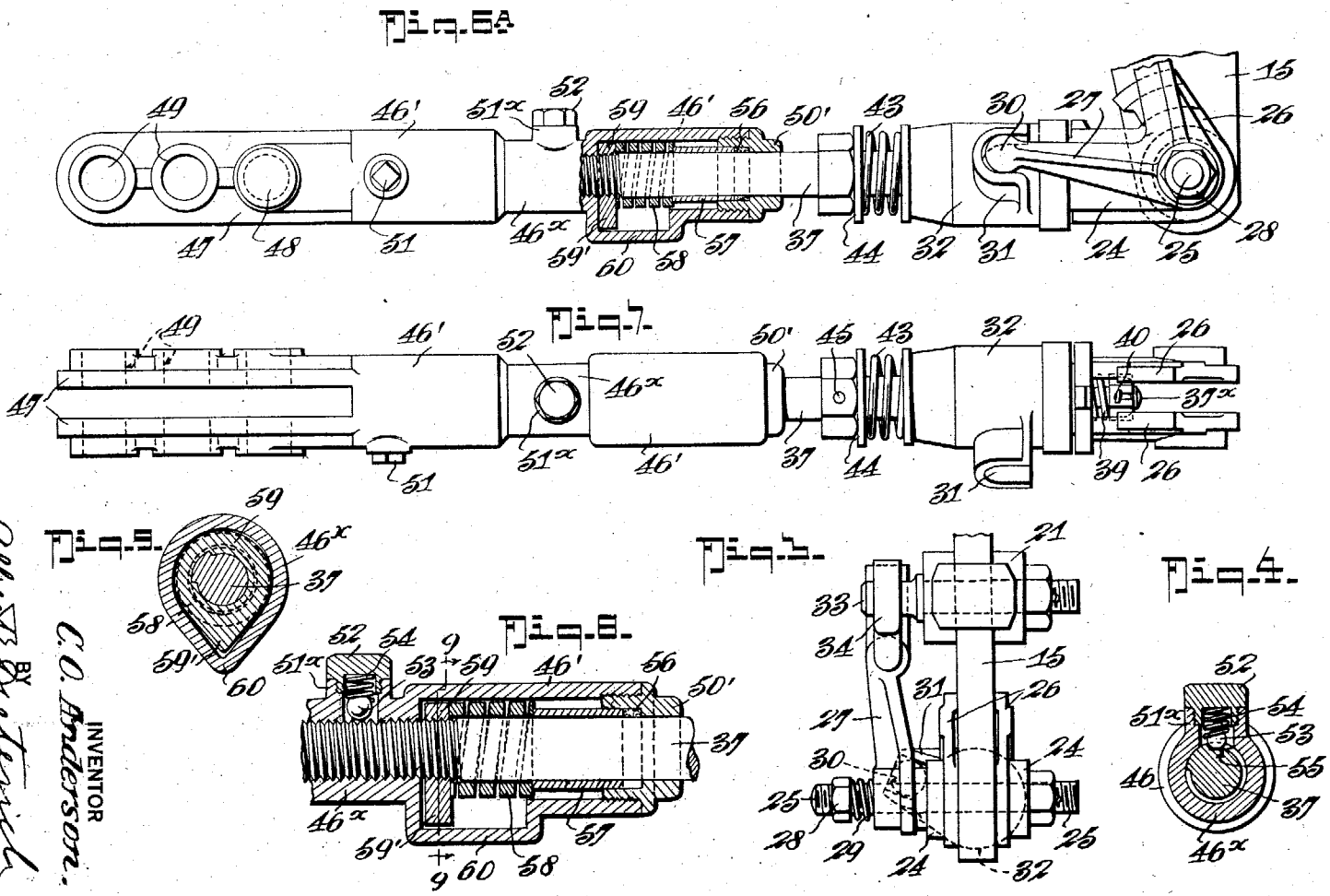
INVENTOR
C. O. Anderson.
BY
Albert E. Dieterich
ATTORNEY July 2, 1929. C. O. ANDERSON Re. 17,344

AUTOMATIC BRAKE ADJUSTING MECHANISM

Original Filed March 26, 1927 3 Sheets-Sheet 3

INVENTOR
C. O. Anderson.
BY
Albert W. Deterich
ATTORNEY

Reissued July 2, 1929. Re. 17,344

UNITED STATES PATENT OFFICE.

CHARLES O. ANDERSON, OF OMAHA, NEBRASKA.

AUTOMATIC BRAKE-ADJUSTING MECHANISM.

Original No. 1,691,325, dated November 13, 1928, Serial No. 178,669, filed March 26, 1927. Application for reissue filed April 10, 1929. Serial No. 354,117.

My invention relates to railway brake mechanism, and especially to automatically operating means for adjusting the brake mechanism to compensate for wear of the brake-shoes and maintain a substantially constant slack or clearance between the brake-shoes and wheels when the brakes are in release position. It is the object of my present invention to provide, in brake-adjusting mechanism of the above character, certain refinements of structure whereby to reduce to a minimum the wear of the mechanism due to vibration, lack of lubrication, and the introduction of abrasive materials into the working parts. A further object of my invention is to provide means for preventing excessive action of the adjusting means, such as to cause separation of the adjusting-screw and the head in which said screw works. A further object is to provide means for preventing looseness between the working parts of the adjuster, whereby to enable operation thereof by the relatively small resisted movement of the brake-levers in so-called "beamless" brake-rigging, wherein the brake-shoes are closely associated with the truck-levers instead of being carried at the ends of brake-beams to which the truck-levers are connected at the center.

Further, it is an object to maintain a definite normal or average friction between the adjusting rod and the forked head, thereby not only avoiding rattling, due to looseness, but also preventing back lash or slippage of the rod while the clutch sleeve is being moved reversely, i. e., moved for the purpose of setting it to a position for turning the adjusting rod to take up slack.

In the accompanying drawings:

Figure 3 is a detail end view of the adjusting mechanism and a portion of the live truck-lever.

Figure 4 is a detail transverse section on the line 4—4 of Figures 5 and 6.

Figures 5, 6, 10:
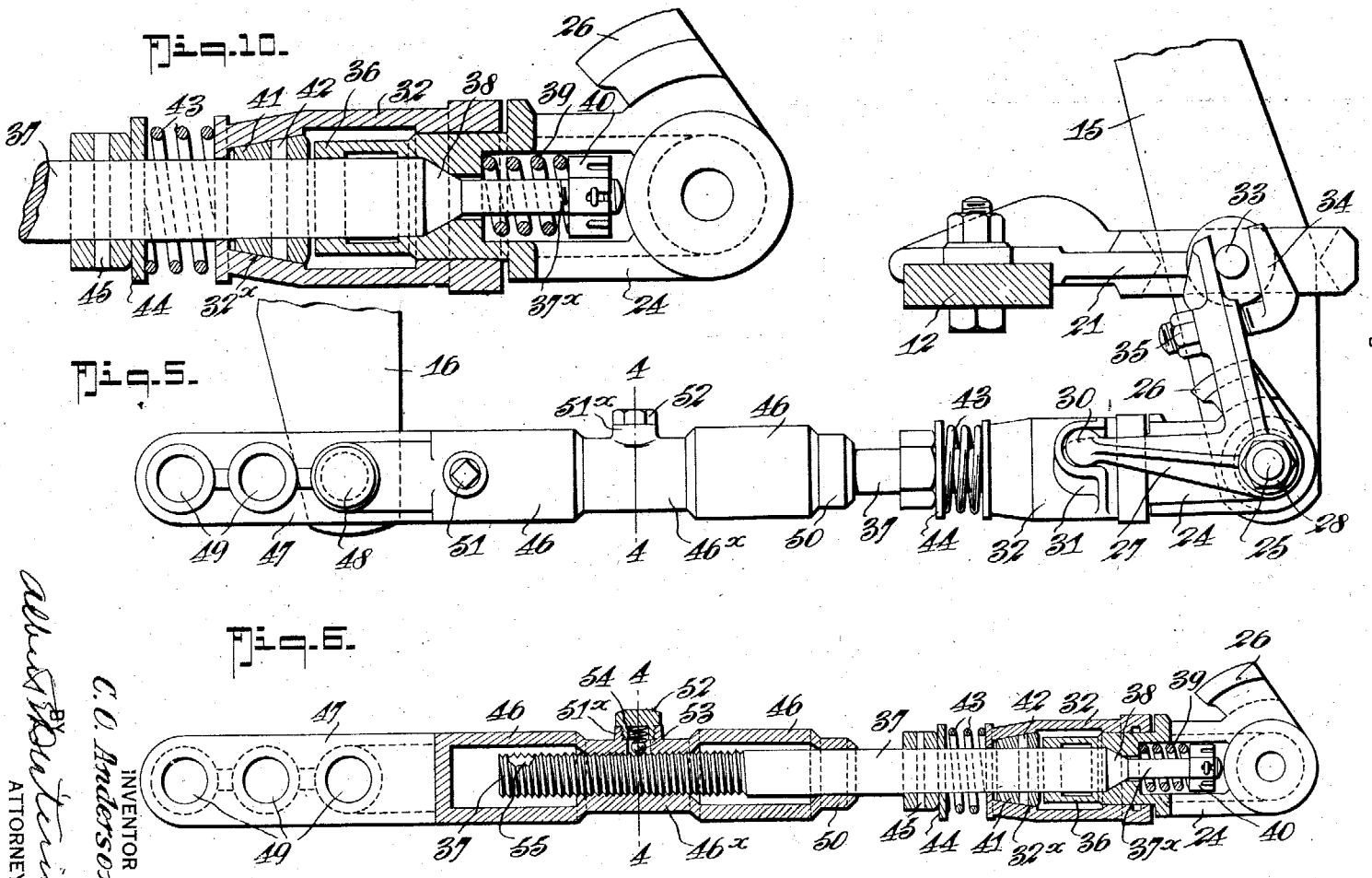
Figure 5 is a side view of the adjusting mechanism.
Figure 6 is a longitudinal section of the same.

Figure 6[a] is a side view, partially in longitudinal section, showing a modified structure.

Figure 7 is a plan view of the same.

Figure 8 is a detail longitudinal section showing a special device for preventing looseness between the adjusting-screw and head.

Figure 9 is a detail transverse section on the line 9—9 of Figure 8, and

Figure 10 is an enlarged vertical longitudinal section of the forked head showing a frictional means which prevents back lash and looseness between the rotatable head and the forked head.

Figure 1:
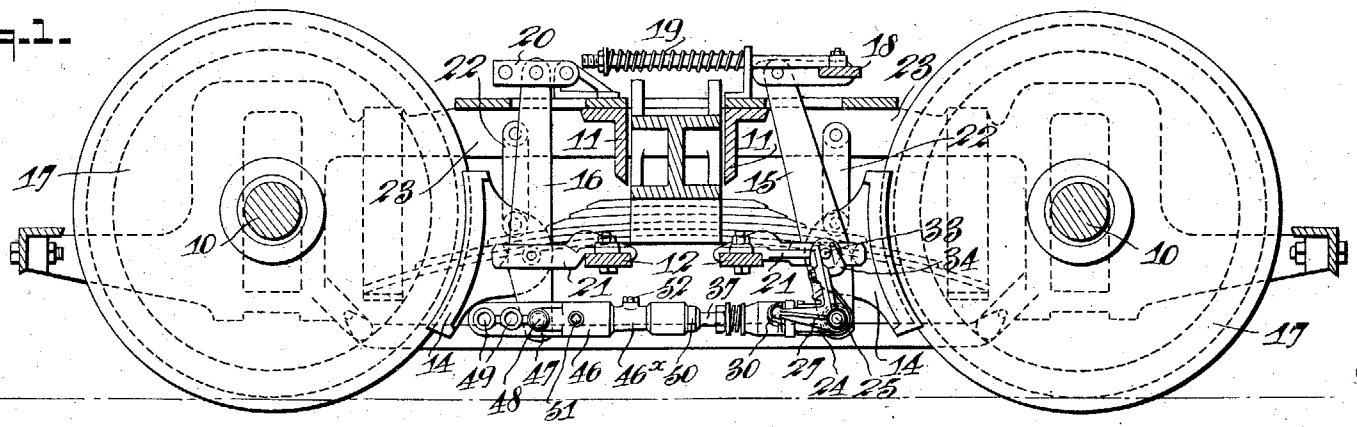
Figure 1 is a longitudinal section of a truck having applied to the brake-levers at one side thereof an adjusting mechanism embodying my invention.
Figure 2:
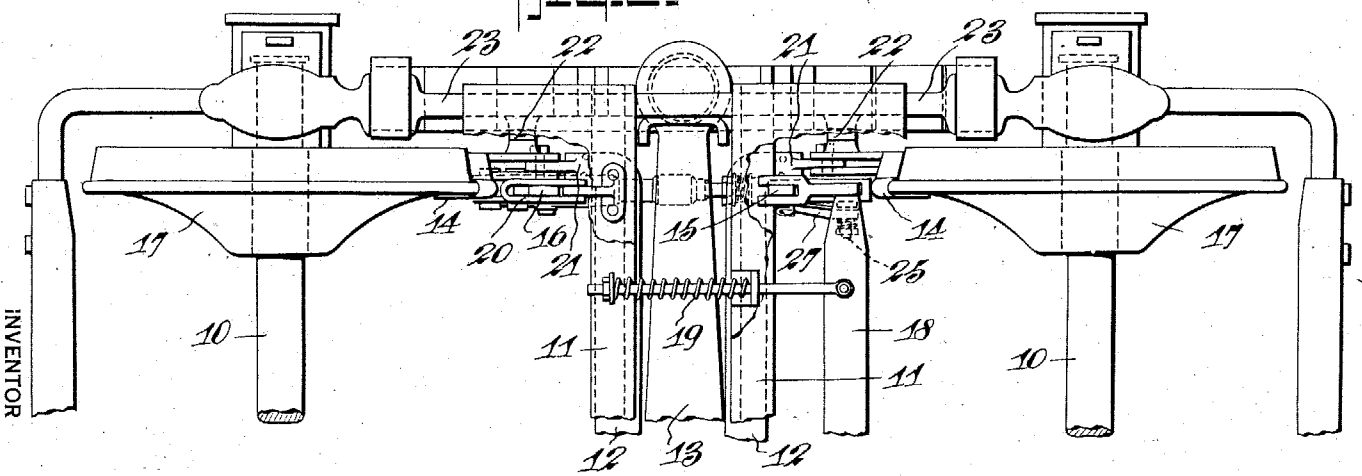
Figure 2 is a plan view of the same.

Referring to Figures 1 and 2, there are shown portions of a truck of a type which has recently come into use for electric railways, and wherein the brake-rigging is commonly designated as "beamless" although in fact the brake-shoes are carried on brake-beams. In trucks of this type, in order to provide space for electric motors hung between the axles 10 and the cross-beams 11 of the truck-frame, the live and dead truck-levers of the brake-rigging are not connected with the central parts of the brake-beams 12, and the main transverse portions of said beams are arranged substantially beneath the bolster 13. In this class of brake-rigging, in order to attain proper equalization of the braking-pressure at the brake-shoes 14, there are employed on each truck two live-levers 15 and two dead-levers 16, one pair thereof being arranged at each side of the truck adjacent to the inner sides of the wheels 17, and the upper ends of the live-levers being connected with each other by a transversely extending equalizing-lever 18 to which the braking power is applied. The release-springs 19 are also connected with said equalizing-lever 18. The upper end of each dead-lever is fulcrumed on a link 20 connected with the cross-beam 11. The intermediate portions of the levers 15 and 16 are connected with the brake-beams 12 by brackets 21 which are secured to said beams close to the ends thereof on which the shoes 14 are attached, and the brake-shoes and beams are supported by hanger-links 22 pivotally connected with the side-frames 23 of the truck. In the illustrated structure the lower ends of the levers 15 and 16 are operatively connected with each other by my improved brake-adjuster, which is automatically extensible longitudinally to compensate for wear of the brake-shoes.

In the brake-rigging of the class above mentioned, and in other cases, such as in locomotive truck and driver brakes, where the brake-levers are closely associated with the brake shoes, without the interposition of a considerable length of brake-beam, the movement of the levers in applying and releasing the brakes is relatively small, because substantially all movement of the levers is immediately effective upon the brake-shoes, and after the brake-shoes are in contact with the wheels very little excess movement of the levers is required to compensate for springing of the brake-beams as the braking pressure is increased. In applying, to such brake-rigging, automatic slack adjusting means which depends for its operation upon variations in the angular relation of the live-lever and the connecting member between said lever and the dead-lever, the adjusting means must be of such construction that it will operate efficiently, and continue to so operate, without the excess travel of the truck-levers usually caused by springing of the brake-beams; and it is this fact which necessitates certain of the refinements of structure of the slack-adjusting mechanism, which constitutes the subject matter of this application. It will be understood, of course, that my improved adjusting mechanism is applicable to the older types of brake-rigging, and is not limited to brake-rigging of the special types above noted.

The adjuster mechanism is best shown in Figures 3, 4, 5, 6 and 7, and, referring to said figures it will be seen that at the end adjoining the live-lever 15 there is a forked head 24 which straddles the end of the live-lever and is pivotally connected therewith by the pin 25. The jaws of said forked head have upwardly extended cheek-plates 26, formed integrally therewith and adapted to closely embrace the sides of the lever, as best shown in Figure 3, for a purpose which will presently appear. A portion of the pin 25 is extended laterally of the head to form a fulcrum for the bell-crank or rocker 27, which is retained thereon by a nut 28 screwed upon the threaded end of the pin, a coil spring 29 being disposed between said nut and the hub of the rocker to frictionally restrain movements of the rocker about the pin, and to thus reduce wear and rattling of these parts. One arm of the rocker extends approximately horizontally and terminates in a ball 30 which fits within a socket formed by a U-shaped flange 31 on the side of the clutch-sleeve 32. The other arm of the rocker extends up approximately parallel with the lever 15, and has a forked upper end portion which straddles the laterally projecting end of the fulcrum pin 33 which connects the lever with the bracket 21 of the brake-beam. One side of the forked end of the arm is formed by a finger 34 which has a threaded shank screwed through the main part of the arm, whereby the space between the jaws of the fork may be adjusted, a lock-nut 35 being provided on the threaded shank for holding the same in adjusted position.

The head 24 has a tubular body-portion 36 over which the clutch-sleeve 32 fits rotatably, and through which is extended the rotatable adjusting-rod 37. Within said tubular portion 36 said rod 37 has a conical shoulder or offset 38 which fits within a conical seat provided within the bore of the head, said shoulder being held against said seat by the pressure of a spring 39 disposed around the reduced end-portion 37× of the rod and retained thereon by a nut 40 screwed upon the threaded end of said reduced portion. Upon the rod 37 adjacent to the end of the tubular body 36 is disposed a conical clutch-collar 41 which is secured to the rod by a transverse pin 42. Said collar 41 is inclosed by the sleeve 32 which is bored to provide a conical seat 32× for engaging the collar, and the sleeve is pressed yieldingly longitudinally of the rod to frictionally engage said seat 32× with the clutch-collar, by means of a spring 43 disposed around the rod at the end of the sleeve and held against the same by a collar 44 secured to the rod by a transverse pin 45, as shown in Figure 6. The main portion of the rod 37, at the end opposite the clutch mechanism, is threaded and screwed into the threaded intermediate portion 46× of the tubular head 46. One end of said head 46 is closed and has a pair of jaws 47 formed integrally therewith and adapted to straddle the lower end of the dead-lever 16, the latter being pivotally connected therewith by a pin 48 passing transversely through any of a plurality of holes 49 in the jaws. The adjusting-screw formed by the threaded part of the rod 37 is covered at all times by the chambered end-portions of the head 46, the open end of said head being extended to normally engage the smooth or unthreaded portion of the rod, and thus forming the guide 50 for holding the head and rod in alignment additionally to the screw-threaded engaging portions of said members. In the side of the head 46 adjacent to the closed end thereof an opening is formed, which is normally closed by a screw-plug 51. By connecting a grease-gun with said opening a suitable lubricant may be forced into and through the head, so as to flow toward the open end thereof, past the adjusting-screw, and thus tend to eject from the bore of the head any dirt, grit or abrasive material which may have entered the same. The chambered end-portions of the head form reservoirs for retaining a quantity of grease sufficient to lubricate the screw during an extended period of use. At the upper side of the threaded intermediate portion of the head 46 a tubular boss 51× is formed thereon, the outer end of the opening thereof being normally closed by a screw-plug 52. At the inner end of said opening, adjoining the screw, is disposed a ball 53 which is pressed yieldingly against the screw by a coil spring 54 disposed between the ball and the plug 52, as shown in Figures 4 and 6. Near the end of the adjusting-screw a notch or recess 55 is formed in the side thereof, one side of said notch being radially undercut so that when the ball drops into the notch, as shown in Figure 4, it will prevent further rotation of the screw in the direction tending to withdraw the screw from the head. The other side of the notch is so inclined that when the screw is turned so as to enter the head the ball will be lifted out of the notch and the turning movement not interrupted.

For use where the adjuster is subjected not only to lateral or "whipping" stresses but also to longitudinal shaking and vibration, it is desirable to prevent wear of the adjusting-screw and the threaded part of the head, by maintaining between the head and screw a longitudinal pressure which is constant in direction. This result is attained by the special means illustrated in Figures 6[a], 8 and 9, wherein the guide-member 50′ at the open end of the head 46′ is formed as a packing-gland screwed into the head, the gland being recessed at its inner end to receive a packing 56 which is engaged by the end of a sleeve 57 fitting slidably over the rod 37. At its inner end the sleeve 57 engages a spring 58 disposed about the rod, and the inner end of said spring engages a nut 59 which is screwed onto the threaded portion of the adjusting-rod. The nut 59 is cylindrical except for a V-shaped projection 59′ at one side, which is extended into a similarly formed pocket 60 at the side of the head, whereby rotation of the nut within the head is prevented, while longitudinal movement is permitted. In assembling the parts the nut 59 is inserted edgewise through the open end of the head, and turned to a transverse position after the projection 59′ is in position to enter the pocket 60. The rod is then screwed through the nut, so as to project slightly past the inner face thereof, before starting to enter the adjacent threaded portion of the head. When the screw is started in said threaded portion, the nut will maintain its longitudinal position relative thereto, as the rotation of the screw will cause it to advance equally through both the nut and the head. The assembly is completed by inserting the spring 58 and sleeve 57, then screwing the gland 50′ into the head, whereby the spring 58 is compressed against the side of the nut, which is thus caused to exert a thrust upon the adjusting-screw. The strength of the spring 58 is such that the longitudinal pressure between the parts remains constant in direction, regardless of any shaking or vibration to which the same are subjected, and wear of the threads by rattling or hammering from such vibration is thereby reduced to a minimum.

In considering the operation of the adjuster as a whole, it will be first noted that the clutch-sleeve 32 is pressed against the clutch-cone 41 with a constant and uniform pressure, proportional to the strength of the spring 43, and any rotational movements of the sleeve thus tend uniformly to be imparted to the adjusting-screw or rod 37 by the frictional clutch connection. The conical shoulder 38 of the adjusting-rod, by being pressed into the seat therefor in the head 24, forms a clutch-like frictional connection between said head and the adjusting-rod. The spring 39 keeps the longitudinal pressure at the conical shoulder constant in direction, as the pressure of said spring is greater than any tensile stresses to which the adjuster is normally subjected, but the total pressure and the resulting friction at the shoulder is variable, being increased by the longitudinal compression of the adjuster when the brakes are applied, and being decreased as the brakes are released. There is a similar variation in the frictional resistance to rotation of the adjusting-screw within the engaged portion of the head 46. The variations of friction, both at the head 46 and at the shoulder 38, are inconsequential during the free or unresisted portion of the brake-applying movements, before the brake-shoes are actually engaged with the wheels, but after such engagement occurs the friction increases substantially in proportion to the braking-pressure exerted upon the shoes.

During a normal brake-applying movement of the live-lever, such as occurs when the slack or clearance between the brake-shoes and wheels is not excessive, the change in the angular relation of the live-lever to the adjuster mechanism merely causes the fulcrum-pin 33 to move between the jaws of the rocker 27, and causes no movement of the rocker relative to the head 24. When the slack is excessive, however, the increased movement of the live-lever in applying the brakes causes the pin 33 to engage the finger or jaw 34 of the rocker and to move the latter slightly about its fulcrum on the pin 25. Such movement of the rocker is communicated to the clutch-sleeve 32 by the ball-head 30 of the lower rocker-arm, causing the clutch-sleeve to be rotated slightly relatively to the head 24, and when the brakes are then released the movement is reversed and the clutch-sleeve is rotated slightly in the opposite direction. These oscillating, or alternating rotative, movements of the clutch-sleeve tend to be imparted by said sleeve to the adjusting-rod 37, by reason of the constant frictional connection between the clutch-sleeve and the collar 41 on said rod. It will be obvious that if the movements in both directions be imparted equally to the adjusting-rod no effective adjustment of the rod will be caused, and the length of the brake-lever-connection, formed by the heads 24 and 46 and the rod 37, will be unchanged. Actuation of the rod 37 occurs, however, when the clutch connection between the sleeve 32 and collar 41 is caused to slip during the movement in one direction. The clutch-friction is so proportioned that such slipping of the clutch connection will occur during the resisted portion of the brake-applying movement, or after the brake-shoes have engaged the wheels and begun to exert some pressure thereon, whereby the longitudinal compression of the brake-lever-connection causes an increase of the frictional resistance to rotation of the screw within the head 46 and of the conical shoulder 38 within the seat therefor in the head 24. After such slippage of the clutch has occurred during a brake-applying movement, then at the end of the succeeding brake-releasing movement the adjusting-screw is turned slightly in the direction required to elongate the truck-lever-connection and reduce the slack. If a sufficient reduction of the slack is effected, subsequent applications of the brakes will cause no movement of the rocker and clutch-sleeve, but the adjusting action will be continued at each application and release of the brakes until the excessive slack is fully compensated.

As hereinbefore noted, the portion of the brake-lever movement which is effective to cause actuation of the automatic slack-adjusting means, is the resisted motion which occurs after the brake-shoes have engaged the wheels, and subsequent to the free motion during which the brake-shoes are merely being moved toward the wheels. Obviously, in brake-rigging of the types first herein mentioned, or in which the brake-levers are closely associated with the brake-shoes, the resisted portion of the brake-applying motion of the levers is of small extent and is merely that which results from the slight resilience of the parts intermediate the truck-levers and brake-shoes, and the slight displacement of the wheels of the truck, allowed by looseness of the journal-boxes and resulting from the brake-pressure against the wheels. In order that the limited amount of resisted motion of the levers may be fully effective in actuating the adjuster, substantially all looseness and lost motion between the parts of the adjusting mechanism must be eliminated, and wear thereof compensated so that looseness will not occur after a period of use. In my improved adjuster the first of the several means, employed for the foregoing purpose, consists in the provision of the cheek-plates 26 on the head 24. Said cheek-plates limit to a minimum any rotational movement of the head 24 about the axis of the adjusting-rod 37, which might otherwise result from looseness of the pin 25 which connects said head 24 with the live-lever 15. The second means for limiting or reducing lost motion in the adjusting device consists in the extension of the rod 37 entirely through the head 24, and the provision of the spring 39 upon the extended portion of the rod, whereby the shoulder 38 is held firmly seated in the head, rattling and wear between the head and rod is minimized, and a definite normal or average friction is assured between the head and rod. The next factor in the elimination of lost motion in the adjuster mechanism is the mounting of the clutch-sleeve 32 upon the adjusting-rod between the clutch-cone or collar 41 and the spring 43, leaving the clutch-sleeve free for longitudinal movement relative to the head 24, and thereby assuring a constant friction at the clutch connection, regardless of the amount or direction of longitudinal stresses in the brake-lever-connection. The extension of the head 46 longitudinally, to cover the threaded portion of the adjusting-rod at all positions of adjustment thereof, assures efficient lubrication of the adjusting-screw, protects the screw-threads from corrosion, excludes dust and abrasive material from the screw, and provides the supplemental guide 50 to assist in maintaining the alignment of the head and screw. The lock or latch device, formed by the ball 53 and the notch 55 in the adjusting-screw, prevents the accidental withdrawal of the screw from the head 46 by the continued operation of the adjusting means, should the renewal of worn brake-shoes be neglected or loss or breakage of parts occur, tending to cause the extension of the adjuster beyond a proper range of adjustment thereof. Finally, the provision of the nut 59 and the spring 58, in the special construction shown in Figure 8, causes a longitudinal pressure, constant in direction, between the adjusting-screw and the threaded part of the head 46, and thus prevents longitudinal play, rattling and wear between said head and the screw.

Further, the presence of the ball 53 and spring 52 tends to prevent rattling of the screw, in the threaded part of the head 46 should the same become somewhat worn and should no device such as the parts 58 and 59 (Figure 8) be used, see Figure 6.

Now, having described my invention, what I claim and desire to secure by Letters Patent is:

1. In an automatic slack-adjuster for brakes, a brake-lever-connection comprising terminal heads connected with the brake-levers, and an intermediate rod connecting said heads and rotatable relatively thereto, a portion of said rod being threaded and engaging a threaded portion of one head, means for maintaining between the rod and the other head a longitudinal pressure constant in direction, a clutch-sleeve mounted rotatively upon said rod and having a constant frictional engagement therewith, and means for actuating said clutch-sleeve in directions alternating as the brakes are applied and released.

2. In a slack-adjuster for brakes, a brake-lever-connection comprising terminal heads pivotally connected with the brake-levers, an intermediate rod connecting said heads and rotatable relatively thereto, a portion of said rod being threaded and engaging a threaded portion of the adjacent head, and means for maintaining between said rod and each of the heads a longitudinal pressure which is constant in direction.

3. In a slack-adjuster for brakes, a brake-lever-connection comprising terminal heads and an intermediate threaded rod connecting said heads and rotatable relatively thereto to vary the length of the connection, means for rotating said rod, means pivotally connecting said heads with the brake-levers, and means formed integrally with one of the heads and closely embracing the sides of the respective brake-lever at a substantial distance from the pivotal axis, whereby to prevent rotative movement of said head relative to said lever about the rod-axis when the pivotal connection of the head and lever becomes worn and loose.

4. In a slack-adjuster for brakes, a brake-lever-connection comprising terminal heads pivotally connected with the brake-levers, and an intermediate rod connecting said heads, said rod having at one end a screw-threaded connection with one of the heads and having at the other end a shouldered reduced portion extending through the other head and rotatable therein, the shouldered portion engaging a seat therefor in said head, and means pressing said shouldered portion yieldingly against said seat.

5. In a brake-lever connection, a rotatable adjusting-rod having a threaded end-portion, a head having at one end thereof jaws for pivotal connection with a brake-lever and having a tubular body inclosing all of the threaded portion and part of the unthreaded portion of the adjusting-rod, said tubular body having an internally threaded part engaged by the threaded portion of the adjusting-rod, a guide carried at the end of the tubular body and fitting about the unthreaded portion of the adjusting-rod, a nut disposed upon the threaded portion of the adjusting-rod within the tubular body between said guide and the threaded part of the body, said nut and the tubular body inter-engaging to prevent relative rotation thereof, and a spring disposed about the rod between the guide and said nut for pressing the latter longitudinally toward the threaded part of the body.

6. In an adjustable brake-lever-connection, an adjusting-screw, a head having a threaded portion engaged by said screw, a nut disposed upon said screw, means for preventing relative rotation of said nut and the head, a spring engaging said nut and pressing the same longitudinally of the screw, and an abutment held in fixed longitudinal relation to the head and engaging said spring to hold the same against the nut.

7. In a slack-adjuster for brakes, a brake-lever-connection comprising terminal heads connected with the brake-levers, and an adjusting rod connecting said heads and rotatable relatively thereto, a portion of said rod being threaded and engaging a threaded portion of one head, a clutch-sleeve mounted rotatively upon said rod, means for maintaining a uniform frictional engagement between said sleeve and the rod, means for actuating the clutch-sleeve in directions alternating as the brakes are applied and released, and means for maintaining between said adjusting-rod and each of the heads a longitudinal pressure which is constant in direction.

8. In a slack-adjuster for brakes, a brake-lever-connection comprising terminal heads pivotally connected with the brake-levers, and an adjusting-rod connecting said heads and rotatable relatively thereto, a portion of said rod being threaded and engaging a threaded portion of one head, a clutch-sleeve mounted rotatively upon said rod, means for actuating the clutch-sleeve in directions alternating as the brakes are applied and released, means for maintaining between said adjusting-rod and each of the heads a longitudinal pressure which is constant in direction but variable in amount according to the longitudinal stresses between the brake-levers, and means for maintaining a uniform clutch-friction between the clutch-sleeve and adjusting rod greater than the friction between said rod and the heads during free movement of the brake-levers and less than the friction between the rod and heads during the resisted movement of the levers occurring after the brake-shoes engage the wheels.

9. In a slack-adjuster for brakes, an automatically extensible brake-lever-connection including a pair of screw-threaded members relatively rotatable to vary the length of the connection, means frictionally connected with one of said members for rotating the same to elongate the connection when the slack is excessive, and a detent carried by one of said threaded members and yieldingly engaged with the other, the latter member having a portion engageable with said detent to prevent extension of the connection beyond a predetermined limit.

10. In a slack-adjuster for brakes, an adjusting-rod having a threaded portion, a tubular head inclosing the threaded portion of the adjusting-rod to form a housing therefor, said head being internally threaded to engage the threaded portion of the rod, the head having a lateral opening intersecting the threaded portion in which the rod is engaged, a member movably disposed in said lateral opening, the rod having an undercut recess in the side thereof adapted to register with said lateral opening, and means for actuating said member to enter said recess as the latter comes into register therewith during rotation of the rod and to thereby prevent further rotation of the rod.

11. In a slack-adjuster for brakes, a brake-lever connection having a forked head straddling the brake-lever, an adjusting-rod rotatively connected with said head, a fulcrum-pin extending transversely through the forked head and brake-lever to pivotally connect the same, and cheek-plates carried by the head and arranged to closely embrace the sides of the lever at a distance from said fulcrum-pin to limit movement of the head about the axis of the adjusting-rod when the fulcrum-pin becomes worn and loose.

12. In a slack-adjuster for brakes, a brake-lever-connection comprising terminal heads pivotally connected with the brake-levers, and an intermediate rod connecting said heads, said rod having at one end a screw-threaded connection with one of the heads and having at the other end a shouldered reduced portion extending through the other head and rotatable therein, and means maintaining frictional connection between said rod and said other head.

13. In a slack-adjuster for brakes, a brake-lever-connection comprising terminal heads pivotally connected with the brake-levers, and an intermediate rod connecting said heads, said rod having at one end a screw threaded connection with one of said heads, the other of said heads having a tubular portion to receive said rod, said rod having a shouldered reduced portion extending through said other head and rotatable therein, and means for maintaining frictional connection between said rod and said other head.

14. In a slack-adjuster for brakes, a brake-lever connection comprising terminal heads pivotally connected with the brake-levers and an intermediate rod connecting said heads, said rod having at one end a screw threaded connection with one of said heads, the other of said heads having a tubular portion to receive said rod, said rod having a shouldered reduced portion extending through said other head and rotatable therein, and means for maintaining a definite normal friction between said rod and said other head.

15. In a slack-adjuster for brakes, a brake-lever connection comprising terminal heads pivotally connected with the brake-levers, and an intermediate rod connecting said heads, said rod having at one end a screw threaded connection with one of said heads, the other of said heads having a tubular portion to receive said rod, said rod having a shouldered reduced portion extending through said other head and rotatable therein, a nut threaded on the reduced portion of said rod and holding said rod and said other head against coming apart, and means cooperating between said rod and said other head to maintain friction between the same for the purposes described.

16. In a slack-adjuster for brakes, a brake-lever-connection comprising terminal heads pivotally connected with the brake-levers, and an intermediate rod connecting said heads, said rod having at one end a screw threaded connection with one of said heads and having at the other end a shouldered reduced portion extending through the other head and rotatable therein, and means maintaining frictional connection between said rod and one of said heads for the purposes described.

17. In a slack-adjuster for brakes, a brake-lever-connection comprising terminal heads pivotally connected with the brake-levers, and an intermediate rod connecting said heads, said rod having at one end a screw-threaded connection with one of said heads and having at the other end a swivel connection with the other head, a clutching means cooperating with said rod and one of the brake-levers for automatically turning said rod for the purposes specified, and means maintaining frictional connection between said rod and one of said heads for holding said rod against turning backwards during the reverse movement of said clutching means.

CHARLES O. ANDERSON.